Feb. 9, 1960 C. P. CHRISTNER 2,924,118
ACCELERATOR THROTTLING LATCH
Filed May 27, 1958
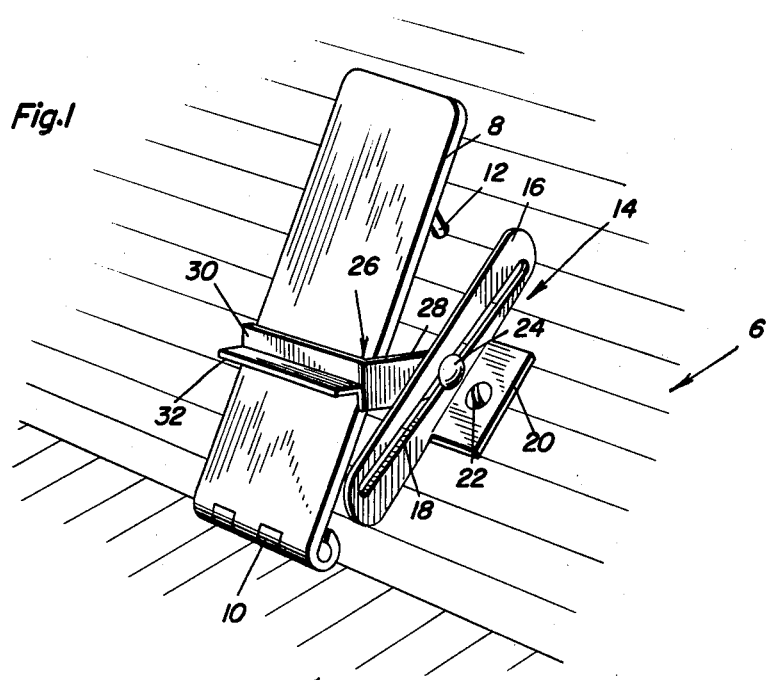
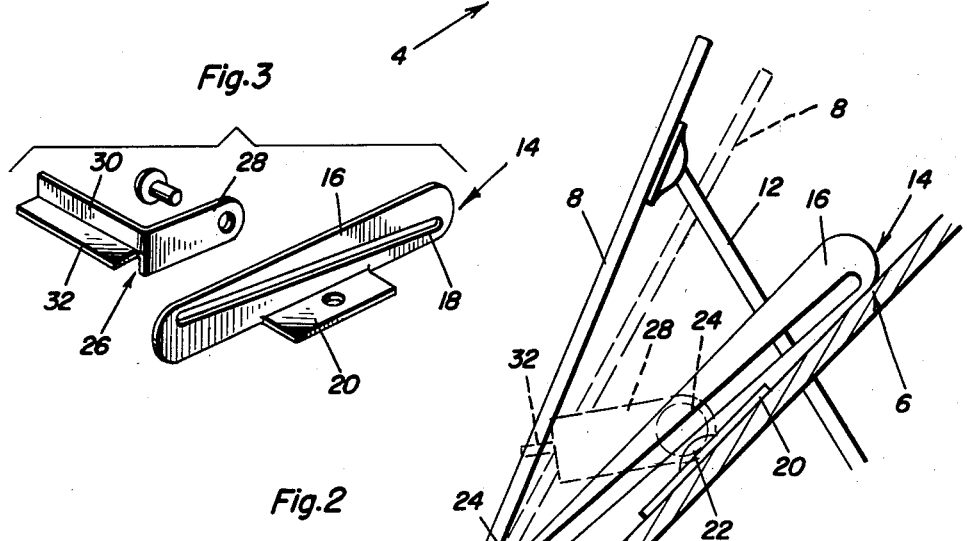
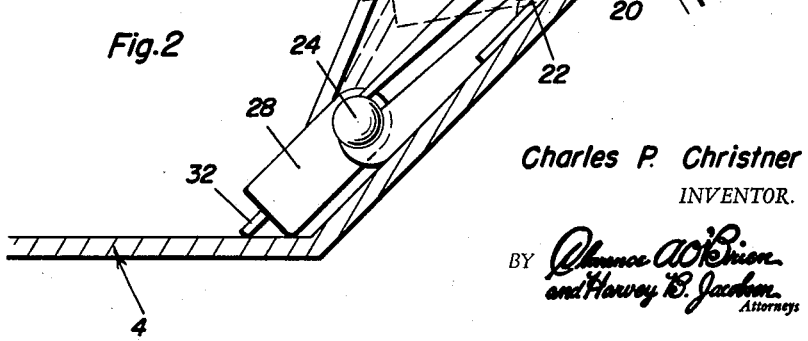
Charles P. Christner
INVENTOR.

United States Patent Office 2,924,118
Patented Feb. 9, 1960

2,924,118

ACCELERATOR THROTTLING LATCH

Charles P. Christner, Jackson, Mich.

Application May 27, 1958, Serial No. 738,172

6 Claims. (Cl. 74—532)

The present invention relates to a novel accessory or contrivance in the nature of a floor board attachment and which is characterized by a simple bracket and a latch-dog operatively mounted on the bracket and designed and adapted to serve as a temporary usable accelerator pedal hold-down latch.

It is a matter of common knowledge to drivers and operators of automobiles and motor vehicles that since means is not now provided on the instrument panel for temporarily regulating and holding the carburetor throttle valve open or closed, as the case may be, one has to rely on using the accelerator pedal as best he can, in a number of situations particularly where the idling speed of the motor is not set high enough for counteracting the choking of the engine before it gets warmed up more particularly in chilly damp weather and especially in cold weather. That is to say, modern automobiles are such that speeding up the motor with the accelerator pedal appears not to be as convenient and as easily attainable as was the situation with so-called older models of automobiles when throttle button controls and standard gear shifts were in vogue.

Although it is true while the transmission gear shift lever is in neutral the average driver has a satisfactory chance of using the accelerator pedal to his advantage in diminishing the likelihood of engine choking, there are times when a car is on an incline it is necessary to either apply the hand brake, of perhaps hold the brake pedal with the left foot and operate the throttle with the right foot. Times are too when hand brakes cannot be relied upon to hold a car against drifting on steep inclines unless they are in good working order and here again left foot brake control is not aways regarded as reliable unless the driver is accustomed to resorting to such practice. In any event, there has long existed a need for a simple mechanical contrivance which may be latched or hooked over the accelerator pedal to temporarily depress it and to thus rely upon such contrivance to temporarily take the place of the foot that would ordinarily be required so that ample time will be had to warm up the motor, or to more satisfactorily start the motor in case it has unexpectedly or accidentally choked on an incline.

Briefly summarized, the invention in a preferred embodiment thereof is characterized by an attaching or anchoring bracket. This is provided with a flange which may be readily fastened to the inclined portion of the automobile floor board. The bracket proper is provided with a slot which is elongated and this part of the bracket is disposed at right angles to the floor. The pivoted hold-down latch is slidingly and pivotally connected to the slotted portion of the bracket and is properly designed and constructed to be moved to a completely out-of-the-way position when not in use, or to be hooked, as it were, over the median portion of the pedal in use to hold the pedal down to sufficiently accelerate the engine or motor to guard against choking in cold and inclement weather.

Other objects, features and advantages will become more readily apparent from the following description and the accompanying drawing:

In the drawing wherein like numerals are employed to designate like parts throughout the views:

Fig. 1 is a perspective view of the invention showing how it is used in connection with a portion of the floor board and accelerator pedal.

Fig. 2 is a view on a larger scale in side elevation and partly in full and dotted lines showing the construction and mode of use.

Fig. 3 is an exploded perspective view.

Referring now to the drawing, and particularly to Figs. 1 and 3, the horizontal portion of the floor board is denoted by the numeral 4 and the inclined portion beneath the instrument panel (not shown) is denoted at 6. The accelerator pedal, which is conventional, is denoted at 8 and the hinged end at 10 and the projectible and retractible push rod is denoted at 12. All of these are old parts and are employed merely to show the advantages and construction of the temporarily usable pedal hold-down latch. The aforementioned bracket is denoted by the numeral 14 and it comprises a vertically disposed elongated plate or body 16 having an elongated slot 18 therein. The slot is preferably oblique angled and inclines from the upper left hand corner to the lower right hand corner in Fig. 2. Consequently, when the right angularly disposed attaching flange 20 is screwed or otherwise fastened in place on the floor as at 22, the slot assumes an inclined position to provide the desired friction retention action for the pivoting and sliding rivet 24 which is operable in said slot and which provides the desired operating connection or coupling between the bracket and the substantially L-shaped hold-down dog or latch 26. This part 26 is a simple expedient as seen in Fig. 3 and comprises a leg or arm 28 which is slidingly and pivotally attached to the slotted bracket plate 16 and which has a laterally directed detent portion 30. This portion 30 is normally positioned over the surface of the pedal when it is in use as seen in Fig. 1 and it is provided with a laterally directed flange 32 which is a sort of a kick element which enables the toe of the user to bring the latch into play with a toe or heel as desired, and when it has served its purposes to "kick" it down and to an out-of-the-way position as seen in Fig. 2.

In applying the device, it is advisable to see that the bracket occupies the approximate position illustrated in Fig. 2 at which time the hold-down latch is dropped down on the floor proper 4 to an out-of-the-way position. Normally, the latch is not employed in a regular course of driving. Therefore, it is necessary to mount the bracket so that the latch will be in this more or less out-of-the-way position at this time. If mounted with the parts in this position it will be evident that the adjustable operating positions of the latch will be proper assuming, of course, that the slotted plate portion is placed sufficiently close to the adjacent longitudinal edge of the accelerator but in no case underneath of the accelerator.

Assuming that the device is installed as illustrated in the drawing, it will be evident that there is provided a practical and reliable easy-to-engage and disengage pedal hold-down latch. When using the throttling and pedal hold-down latch, the toe of the right foot swings the latch into place from its down or out-of-the-way position (Fig. 2). When the latch is in the position shown for example in Fig. 1, it prevents the spring returned pedal or accelerator 8 from returning to its full "up" position. Of course, the position of the latch in relation to the slotted plate can be made variable so that a change in speed can be had. For example, when one has allowed an automobile to remain idle for a few days at a time and desires to recharge the battery, instead of having to sit in the car and hold the pedal down with the foot all that is necessary is to bring this little latch into position and the engine can be kept running for quite some time without any inconvenience to the occupant of the car, that is, if he desires to stay in the car while the engine idles away to charge the battery.

The oblique angled slot in the bracket and the sliding and hinging connection is such that the spring pressure of the pedal against the part 30 of the latch causes the over-all latch to stay put in the position in the slot to which it has been intentionally moved by the user.

It is a matter of common knowledge that drivers and operators of automobiles learn their own private and individual ways of utilizing accessories and appliances and such will be the case here. Under the circumstances, it seems unnecessary to mention the various use or operation aspects since, in the final analysis, it is the physical or tangible device that is at stake.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. In combination, an automobile floor board, a carburetor control rod mounted for operation in opening means provided therefor in said floor board, an elongated accelerator pedal mounted at one end for operation on the floor board and cooperating with the adjacent end of the rod, and temporary usable accelerator pedal holddown and releasing means mounted on said floor board and embodying a pivotally and longitudinally slidably mounted latch which may be readily applied at any desired point to the accelerator pedal and removed at the discretion of the driver of the automobile.

2. The structure defined in claim 1, and wherein said latch is generally L-shaped, having a portion which bridges transversely over the foot surface of the accelerator pedal, and a lateral arm portion which is hingedly and slidingly bracketed to the floor.

3. The structure defined in claim 1, and wherein said latch is generally L-shaped, having a portion which bridges transversely over the foot surface of the accelerator pedal, and a lateral arm portion which is hingedly and slidingly bracketed to the floor by way of a bracket, said bracket having an attaching flange and a body portion with a longitudinal slot in which a pin is mounted and which pin provides a connection between the latch and slotted portion of the bracket.

4. A floor board attachment which may be used as a temporary hold-down latch for an elongated accelerator pedal having one end hingedly secured to the floor of a motor vehicle, said attachment comprising a floor bracket adapted to be mounted on the floor, and a generally L-shaped latch having an arm portion pivotally and longitudinally slidably connected with a cooperating part of said floor bracket, and a hold-down portion adapted to bridge the accelerator pedal for engagement therewith at any desired point.

5. The structure defined in claim 4, wherein said last named portion has a laterally bent flange to facilitate applying and removing the latch with the toe or heel of the operator's shoe as the case may be.

6. For an elongated engine accelerator pedal having one end hingedly secured to the floor of a motor vehicle and its other end free, a holddown comprising: a bracket mounted on the floor adjacent the pedal, and a latch pivotally and slidably mounted on said bracket and longitudinally adjustably engageable with the pedal for securing same in any desired depressed position for idling the engine at various speeds.

References Cited in the file of this patent

UNITED STATES PATENTS

| 1,350,272 | Bernet | Aug. 17, 1920 |
| 1,392,316 | Finch | Oct. 4, 1921 |
| 1,572,774 | Croxford | Feb. 9, 1926 |
| 1,613,237 | Meyer | Jan. 4, 1927 |
| 2,553,448 | Frauen | May 15, 1951 |
| 2,787,918 | Dow | Apr. 9, 1957 |
| 2,803,971 | Turner | Aug. 27, 1957 |